(12) United States Patent
Byrne et al.

(10) Patent No.: US 11,447,260 B2
(45) Date of Patent: Sep. 20, 2022

(54) COWL DOOR LATCH ASSEMBLY

(71) Applicant: Rohr, Inc., Chula Vista, CA (US)

(72) Inventors: Stuart J. Byrne, San Diego, CA (US); Sarah Lohman, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 419 days.

(21) Appl. No.: 16/593,259

(22) Filed: Oct. 4, 2019

(65) Prior Publication Data

US 2021/0101690 A1 Apr. 8, 2021

(51) Int. Cl.
*B64D 29/06* (2006.01)
*E05C 19/12* (2006.01)

(52) U.S. Cl.
CPC .............. *B64D 29/06* (2013.01); *E05C 19/12* (2013.01)

(58) Field of Classification Search
CPC ........ B64D 29/00; B64D 29/06; B64D 29/08; E05C 19/12
USPC ...................................................... 244/129.5
See application file for complete search history.

(56) References Cited

U.S. PATENT DOCUMENTS

| | | | |
|---|---|---|---|
| 4,320,912 A | 3/1982 | Grace | |
| 6,458,309 B1 | 10/2002 | Allen | |
| 9,567,089 B2 | 2/2017 | Layland | |
| 2014/0225380 A1* | 8/2014 | Gonidec | E05C 19/12 292/129 |
| 2017/0058583 A1* | 3/2017 | Kim | E05C 19/14 |
| 2017/0240287 A1* | 8/2017 | Oonishi | B64D 27/18 |
| 2018/0127107 A1 | 5/2018 | Delaney | |
| 2019/0136589 A1* | 5/2019 | Romero Galan | E05B 81/72 |
| 2019/0299547 A1* | 10/2019 | Sridharakannan | B29C 70/30 |

FOREIGN PATENT DOCUMENTS

| | | |
|---|---|---|
| FR | 3054827 B1 | 8/2019 |
| WO | 9639326 W | 12/1996 |
| WO | 2015140449 A1 | 9/2015 |
| WO | 2019012286 A1 | 1/2019 |

OTHER PUBLICATIONS

EP search report for EP19212389.1 dated Jun. 23, 2020.

* cited by examiner

*Primary Examiner* — Brady W Frazier
(74) *Attorney, Agent, or Firm* — Getz Balich LLC

(57) ABSTRACT

A cowl door includes a cowl door body having a first side, a second side, and an interior surface and an exterior surface extending between the first side and the second side. The cowl door body is configured to be rotatably mounted to a structure at the first side of the cowl door body. At least one stiffener is mounted to the interior surface of the cowl door body and extends lengthwise at least a portion of a distance between the first side and the second side of the cowl door body. The at least one stiffener includes a stiffener body having a latch housing section disposed at a second stiffener end of the stiffener body proximate the second side of the cowl door body. A latch member is mounted to the stiffener body and disposed at least partially within the latch housing section of the stiffener body.

18 Claims, 11 Drawing Sheets

COWL DOOR LATCH ASSEMBLY

BACKGROUND

1. Technical Field

This disclosure relates generally to cowl doors for a gas turbine engine nacelle, and more particularly to latches for securing cowl doors.

2. Background Information

Modern aircraft gas turbine engines may include a nacelle configured to house the engine and other auxiliary systems. The nacelle may include one or more cowl sections associated with particular sections of the gas turbine engine. For example, the nacelle may include a fan cowl or a thrust reverser cowl. The cowl sections may include one or more cowl doors configured to provide access to internal gas turbine engine components. For example, the fan cowl may include two opposing hinged cowl doors configured to provide access to the fan case and other components in proximity to the fan case.

One or more latch assemblies may be used to secure the cowl doors together in a closed position. However, such latch assemblies may be heavy and mounting the latch assemblies to the cowl doors may require a large number of fasteners. As a result, the cost, weight, and complexity of manufacturing the cowl doors may be increased. Accordingly, a need exists for a latch assembly addressing one or more of the above-noted concerns.

SUMMARY

According to an embodiment of the present disclosure, a cowl door includes a cowl door body having a first side, a second side, and an interior surface and an exterior surface extending between the first side and the second side. The cowl door body is configured to be rotatably mounted to a structure at the first side of the cowl door body. At least one stiffener is mounted to the interior surface of the cowl door body and extends lengthwise at least a portion of a distance between the first side and the second side of the cowl door body. The at least one stiffener includes a stiffener body having a latch housing section disposed at a second stiffener end of the stiffener body proximate the second side of the cowl door body. A latch member is mounted to the stiffener body and disposed at least partially within the latch housing section of the stiffener body.

In the alternative or additionally thereto, in the foregoing embodiment, the latch member is a latch rotatably mounted to the stiffener body.

In the alternative or additionally thereto, in the foregoing embodiment, the latch member is a keeper fixedly mounted to the stiffener body.

In the alternative or additionally thereto, in the foregoing embodiment, the stiffener body further includes a mount portion mounted to the interior surface of the cowl door body and a hoop portion projecting outward from the mount portion.

In the alternative or additionally thereto, in the foregoing embodiment, the stiffener body has a first stiffener end opposite the second stiffener end. The stiffener body further includes a support section that extends from the first stiffener end a portion of a length of the stiffener body and the latch housing section extends from the second stiffener end another portion of the length of the stiffener body. The hoop portion of the stiffener body has a first width at the latch housing section and a second width at the support section, different than the first width.

In the alternative or additionally thereto, in the foregoing embodiment, the stiffener body has a first height at the latch housing section and a second height at the support section, different than the first height.

In the alternative or additionally thereto, in the foregoing embodiment, the stiffener body further includes a transition section disposed between the latch housing section and the support section. The transition section has a transition height and a transition width that transitions from the first height and the first width to the second height and the second width along a length of the transition section from the latch housing section to the support section.

In the alternative or additionally thereto, in the foregoing embodiment, the stiffener body is made from a composite material.

According to another embodiment of the present disclosure, a nacelle for a gas turbine engine includes a nacelle body and a first cowl door. The first cowl door includes a first cowl door body having a first side, a second side, and an interior surface and an exterior surface extending between the first side and the second side. The first cowl door body is rotatably mounted to the nacelle body at the first side of the second cowl door. At least one first stiffener is mounted to the interior surface of the first cowl door body and extends lengthwise at least a portion of a distance between the first side and the second side of the first cowl door body. The at least one first stiffener includes a first stiffener body having a first latch housing section disposed at a second stiffener end of the first stiffener body proximate the second side of the first cowl door body. A first latch member is mounted to the first stiffener body and disposed at least partially within the first latch housing section of the first stiffener body.

In the alternative or additionally thereto, in the foregoing embodiment, the nacelle further includes a second cowl door configured to be latched to the first cowl door. The second cowl door includes a second cowl door body having a first side, a second side, and an interior surface and an exterior surface extending between the first side and the second side. The second cowl door body is rotatably mounted to the nacelle body at the first side of the second cowl door. At least one second stiffener is mounted to the interior surface of the second cowl door body and extends lengthwise at least a portion of a distance between the first side and the second side of the second cowl door body. The at least one second stiffener includes a second stiffener body having a second latch housing section disposed at a second stiffener end of the second stiffener body proximate the second side of the second cowl door body. A second latch member is mounted to the second stiffener body and disposed at least partially within the second latch housing section of the second stiffener body.

In the alternative or additionally thereto, in the foregoing embodiment, the first latch member and the second latch member are configured to engage one another with the first cowl door and the second cowl door in respective closed positions.

In the alternative or additionally thereto, in the foregoing embodiment, the first latch member is a latch rotatably mounted to the first stiffener body and the second latch member is a keeper fixedly mounted to the second stiffener body.

In the alternative or additionally thereto, in the foregoing embodiment, the at least one first stiffener further includes a first interface member mounted to the first stiffener body and the at least one second stiffener further includes a second interface member mounted to the second stiffener body.

In the alternative or additionally thereto, in the foregoing embodiment, the first interface member and the second interface member are configured to engage one another with the first cowl door and the second cowl door in the respective closed positions.

In the alternative or additionally thereto, in the foregoing embodiment, the first stiffener body and the second stiffener body are made from a composite material.

According to another embodiment of the present disclosure, a method for forming a cowl door is provided. A cowl door body having a first side, a second side, and an interior surface and an exterior surface extending between the first side and the second side is provided. The cowl door body is configured to be rotatably mounted to a structure at the first side. At least one stiffener is mounted to the interior surface of the cowl door body. The at least one stiffener extends lengthwise at least a portion of a distance between the first side and the second side of the cowl door body. The at least one stiffener includes a stiffener body having a latch housing section disposed at a second stiffener end of the stiffener body proximate the second side of the cowl door body. A latch member is mounted to the stiffener body. The latch member is disposed at least partially within the latch housing section of the stiffener body.

In the alternative or additionally thereto, in the foregoing embodiment, the stiffener body and the cowl door are made from a composite material.

In the alternative or additionally thereto, in the foregoing embodiment, the step of mounting the at least one stiffener to the interior surface of the cowl door body includes forming a thermoplastic weld between the at least one stiffener and the cowl door body.

In the alternative or additionally thereto, in the foregoing embodiment, the latch member is a latch rotatably mounted to the stiffener body.

In the alternative or additionally thereto, in the foregoing embodiment, the latch member is a keeper fixedly mounted to the stiffener body.

The present disclosure, and all its aspects, embodiments and advantages associated therewith will become more readily apparent in view of the detailed description provided below, including the accompanying drawings.

DETAILED DESCRIPTION

Figure 1:
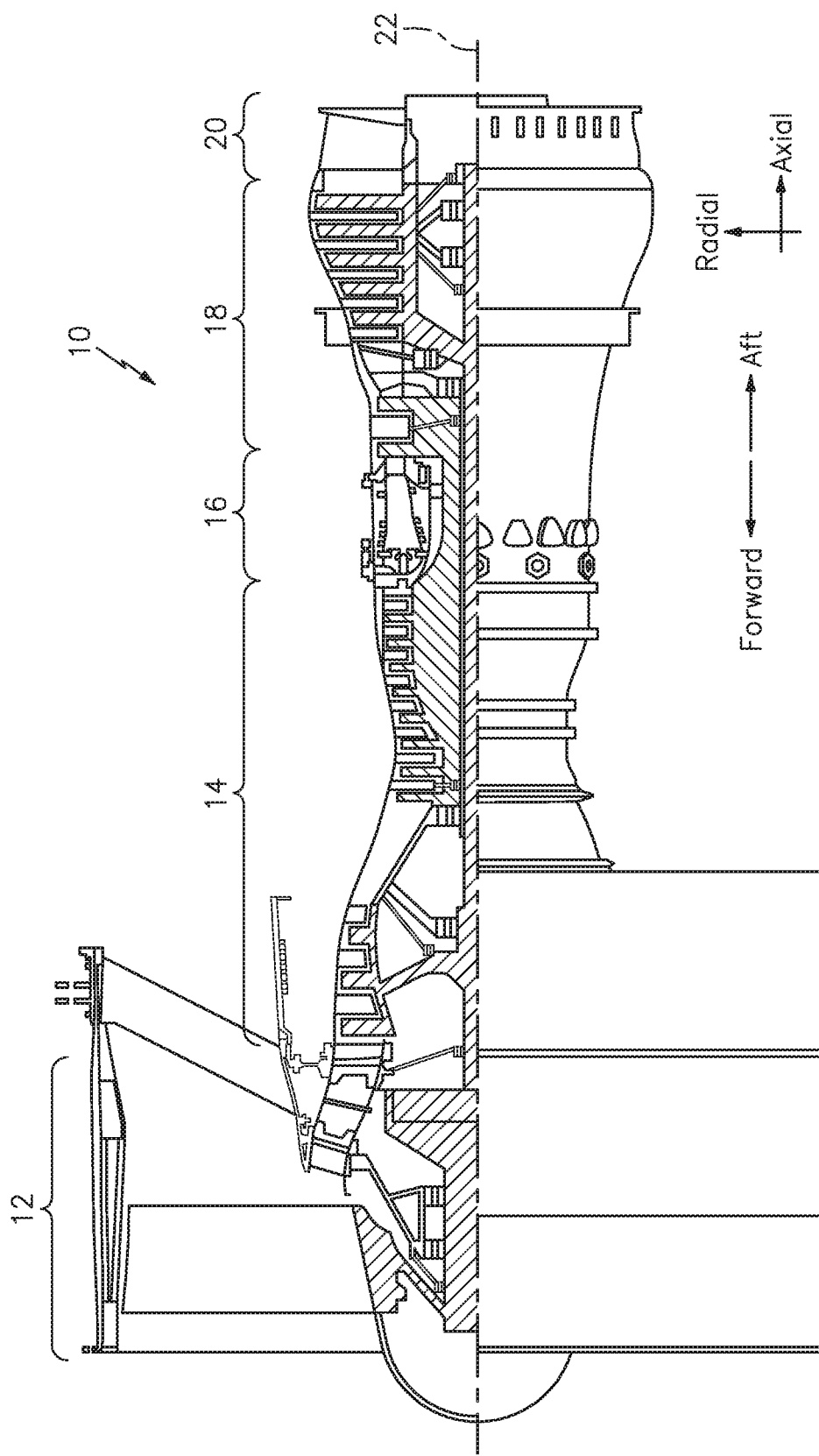
FIG. 1 illustrates a side, cross-sectional view of a gas turbine engine according to one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings.

Figure 2A:
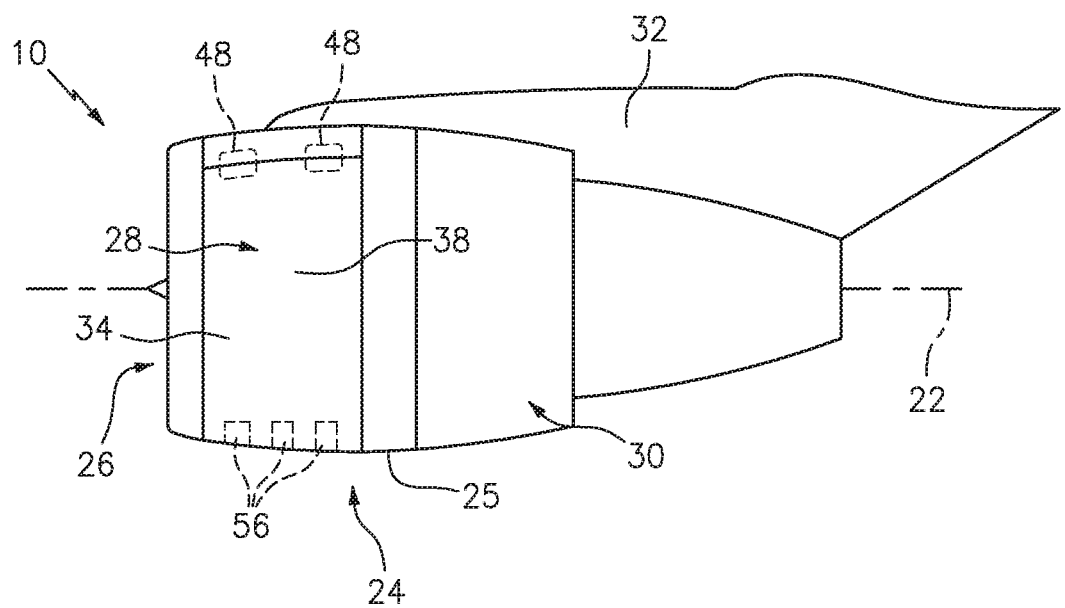
FIG. 2A illustrates a side view of a gas turbine engine according to one or more embodiments of the present disclosure.
Figure 2B:
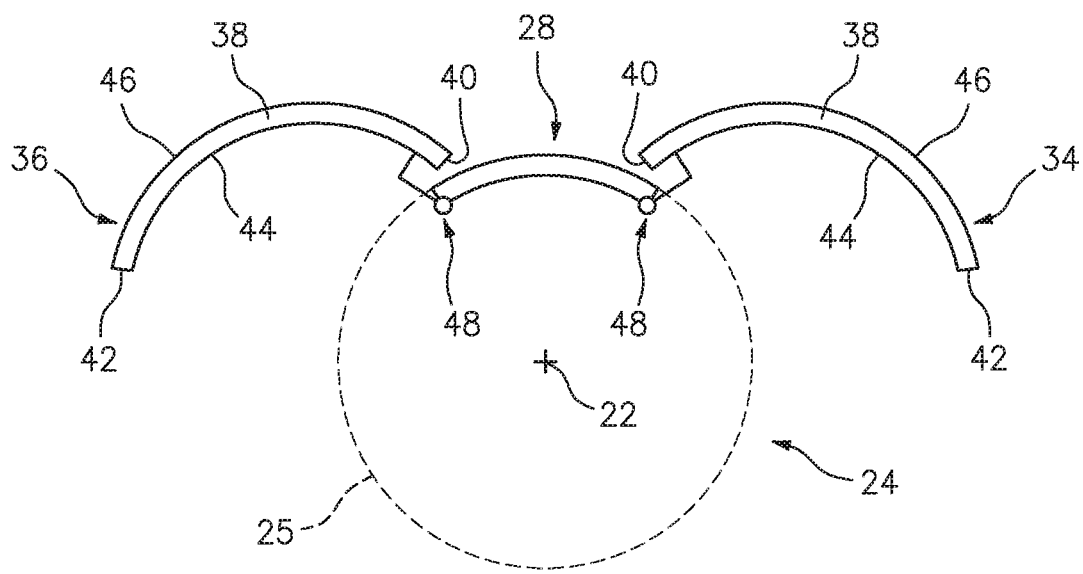
FIG. 2B illustrates a front view of the gas turbine engine of FIG. 2A according to one or more embodiments of the present disclosure.

Referring to FIGS. 1, 2A, and 2B, a gas turbine engine 10 generally includes a fan section 12, a compressor section 14, a combustor section 16, a turbine section 18, and an exhaust section 20 disposed about an axial centerline 22. The gas turbine engine 10 further includes a nacelle 24 defining an exterior housing of the gas turbine engine 10 about the axial centerline 22. The nacelle 24 may include an inlet 26, a fan cowl 28, and a thrust reverser 30. The nacelle 24 may be coupled to a pylon 32 which may mount the gas turbine engine 10 to an aircraft wing or fuselage (not shown).

The fan cowl 28 and the thrust reverser 30 may include one or more cowl doors configured to provide access to internal portions of the gas turbine engine 10 for inspections and maintenance. For example, the fan cowl 28 may include a first cowl door 34 and a second cowl door 36. Each of the cowl doors 34, 36 includes a cowl door body 38 having a first side 40, a second side 42, and an interior surface 44 and an exterior surface 46 extending between the first side 40 and the second side 42. Each of the cowl doors 34, 36 may be rotatably mounted to a nacelle body 25 of the nacelle 24 by one or more hinges 48 (e.g., gooseneck hinges). For example, as shown in FIGS. 2A and 2B, each of the cowl doors 34, 36 may be mounted to the nacelle 24 at or proximate the first side 40 of the cowl door body 38 by the hinges 48. In various other embodiments the cowl doors 34, 36 may be mounted to structures other than the nacelle 24. For example, the cowl doors 34, 36 may be mounted to the pylon 32 or other engine or aircraft structures. The cowl door bodies 38 of the first and second cowl doors 34, 36 may be configured to substantially contact one another with the first and second cowl doors 34, 36 in a closed position (minor gaps or misalignment, within design tolerances, may exist between the cowl doors 34, 36).

As used herein, "closed position" will be used to refer to the cowl doors 34, 36 in a position so as to form a portion of a substantially continuous exterior surface of the nacelle 24 (e.g., the cowl doors 34, 36 are positioned for flight). The "open position" will be used to refer to the cowl doors 34, 36 in a position other than the closed position (e.g., the cowl doors 34, 36 are partially open, fully open, etc.). While the present disclosure will be explained with reference to cowl doors 34, 36 for the fan cowl 28, those of ordinary skill in the art will recognize that the present disclosure is also applicable to other cowl doors (e.g., thrust reverser cowl doors, core cowl doors, etc.), access panels, etc. configured to permit access to internal components of the gas turbine engine 10 or other equipment (e.g., industrial gas turbine engines, wind turbines, etc.).

Figure 3:
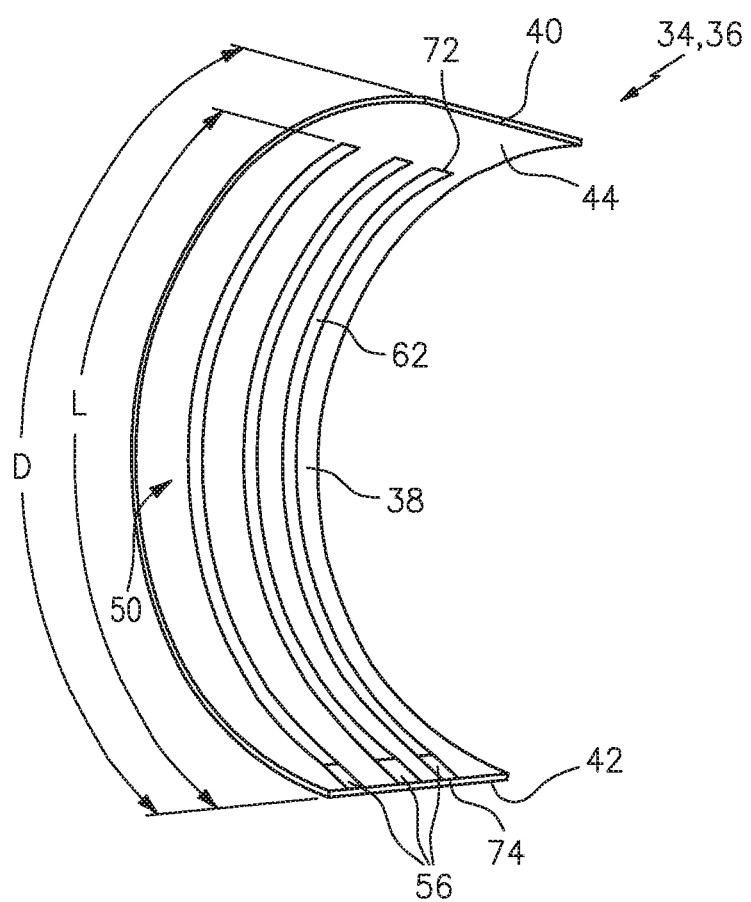
FIG. 3 illustrates a perspective view of an interior of a cowl door according to one or more embodiments of the present disclosure.
Figure 4:
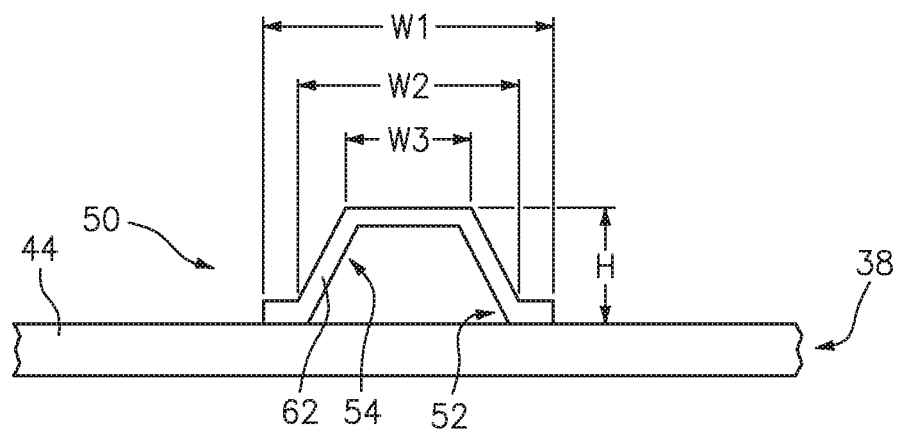
FIG. 4 illustrates a lengthwise cross-sectional view of a stiffener for the cowl door of FIG. 3 according to one or more embodiments of the present disclosure.

Referring to FIGS. 3 and 4, the cowl doors 34, 36 may include at least one stiffener 50 mounted to the interior surface 44 of the cowl door body 38. The at least one stiffener 50 may extend lengthwise at least a portion of a circumferential distance D between the first side 40 and the second side 42 of the cowl door body 36. For example, in various embodiments, the at least one stiffener 50 may have a circumferential length L that is at least fifty percent of the circumferential distance D. In various other embodiments, the circumferential length L of the at least one stiffener 50 may be at least eighty percent of the circumferential distance D (e.g., the circumferential length L may be between eighty and 100 percent of the circumferential distance D). The at least one stiffener 50 may include a plurality of stiffeners. For example, the at least one stiffener 50 may include 2, 3, 4, 5, or more stiffeners.

In various embodiments, the at least one stiffener 50 may be configured as a "hoop" stiffener. The at least one stiffener 50 includes a stiffener body 62 having a first stiffener end 72 and a second stiffener end 74 opposite the first stiffener end 72. The stiffener body 62 may include a mount portion 52 mounted to the interior surface 44 of the cowl door body 38. The at least one stiffener 50 may further include a hoop portion 54 projecting radially inward from the mount portion 52. The stiffener body 62 has a width W1 and a height H, as shown, for example, in FIG. 4. The hoop portion 54 of the stiffener body 62 has an inner width W2 and an outer width W3. As shown in FIG. 4, in various embodiments, the width W1 may be greater than the width W2 which may be greater than the width W3. However, it should be understood that the widths W1, W2, W3 are not limited in this respect. For example, the width W2 may be less than or equal to the width W1 and the width W3 may be less than or equal to the width W2. In various embodiments, the widths W1, W2, W3 and height H may be different at various portions of the stiffener body 62 along the length L of the stiffener body 62 compared to respective widths W1, W2, W3 and height H at various other portions of the stiffener body 62.

Referring to FIGS. 2A and 3, the cowl doors 34, 36 may include at least one latch assembly 56 configured to secure the first cowl door 34 to the second cowl door 36. The at least one latch assembly 56 may include a plurality of latch assemblies. For example, the at least one latch assembly 56 may include 2, 3, 4, 5, or more latch assemblies depending, for example, on the size of the cowl doors 34, 36. The at least one latch assembly 56 is separable such that a first portion 58 (see, e.g., FIG. 7) of the at least one latch assembly 56 is mounted to the first cowl door 34 while a second portion 60 (see, e.g., FIG. 10) of the at least one latch assembly 56 is mounted to the second cowl door 36. Accordingly, the portions 58, 60 are configured to be engaged with one another with the cowl doors 34, 36 in the closed position. As used herein, the term "engaged" with respect to the latch assembly 56 indicates that the latch assembly 56 is in a final condition for securing the first and second cowl doors 34, 36 in the closed position for flight. The term "disengaged" will be used to refer to the latch assembly 56 in a condition other than the engaged condition. In various embodiments, one of the portions 58, 60 of the at least one latch assembly 56 may be mounted to a fixed portion of the nacelle 24 such that a single cowl door, such as the first cowl door 34 or the second cowl door 36, can be secured to the nacelle 24 without the need for a second cowl door.

Referring to FIGS. 3 and 5-11, the at least one stiffener 50 including portions 58, 60 of the latch assembly 56 is shown. The stiffener body 62 further includes a latch housing section 64, a transition section 66, and a support section 68. The portions 58, 60 of the latch assembly 56 each include a latch member 70 mounted to the stiffener body 62 and disposed at least partially within the latch housing section 64 of the stiffener body 62. The latch housing section 64 of the stiffener body 62 extends from the second stiffener end 74 a portion of a length of the stiffener body 62. The support section 68 of the stiffener body 62 extends from the first stiffener end 72 another portion of a length of the stiffener body 62. The transition section 66 of the stiffener body 62 is disposed between the latch housing section 64 and the support section 68. The second stiffener end 74 of the stiffener body 62 is disposed proximate the second side 42 of the cowl door body 38. For example, the second stiffener end 74 of the stiffener body 62 may be disposed proximate the second side 42 of the cowl door body 38 such that the latch members 70 disposed within the latch housing section 64 can interact with one another with the cowl doors 34, 36 in the closed position. Thus, in various embodiments, the latch housing section 64 of the stiffener body 62 may extend to the second side 42 of the cowl door body 38 or may be spaced from the second side 42 of the cowl door body 38 by, for example, a distance less than or equal to three inches or, for example, a distance less than or equal to one inch.

In various embodiments, the latch housing section 64 of the stiffener body 62 may include an opening 76 extending through the hoop portion 54 of the stiffener body 62. For example, the opening 76 may allow access to the portions 58, 60 of the at least one latch assembly 56, for example, for installation or maintenance of the at least one latch assembly 56.

In various embodiments, the height H and/or one or more of the widths W1, W2, W3, of the transition section 66 of the stiffener body 62 may transition along a length of the transition section 66 from a first value to a second value. For example, the height H and/or one or more of the widths W1, W2, W3 may transition along the length of the transition section 66 from the support section 68 to the latch housing section 64 such that the latch housing section 64 is sized to house the respective portion 58, 60 of the at least one latch assembly 56. As such, the stiffener body 62 may have a first height H and/or width W1, W2, W3 at the latch housing section 64 and a second height H and/or width W1, W2, W3 at the support section 68 that is different than the first height H and/or width W1, W2, W3. In various embodiments, the height H and/or width W1, W2, W3 of the stiffener body 62 in the support section 68 is substantially constant along a length of the support section 68.

In various embodiments, the stiffener body 62 may be made entirely from a composite material such as, for example, a thermoplastic material. However, it should be understood that the stiffener body 62 may be made from any material possessing sufficient rigidity, durability, and light-weight qualities suitable for use in the at least one stiffener 50. In various embodiments, the stiffener body 62 may be mounted to the interior surface 44 of the cowl door body 38 by a plurality of welds 78. In various embodiments, both the cowl door body 38 and the stiffener body 62 may be made from a same material, for example, the cowl door body 38 and the stiffener body 62 may be made from a thermoplastic material and the plurality of welds 78 may be thermoplastic welds. The stiffener body 62 may additionally or alternatively be mounted to the interior surface 44 of the cowl door body 38 by fasteners, adhesives, and/or any other suitable means for mounting.

Figure 11:
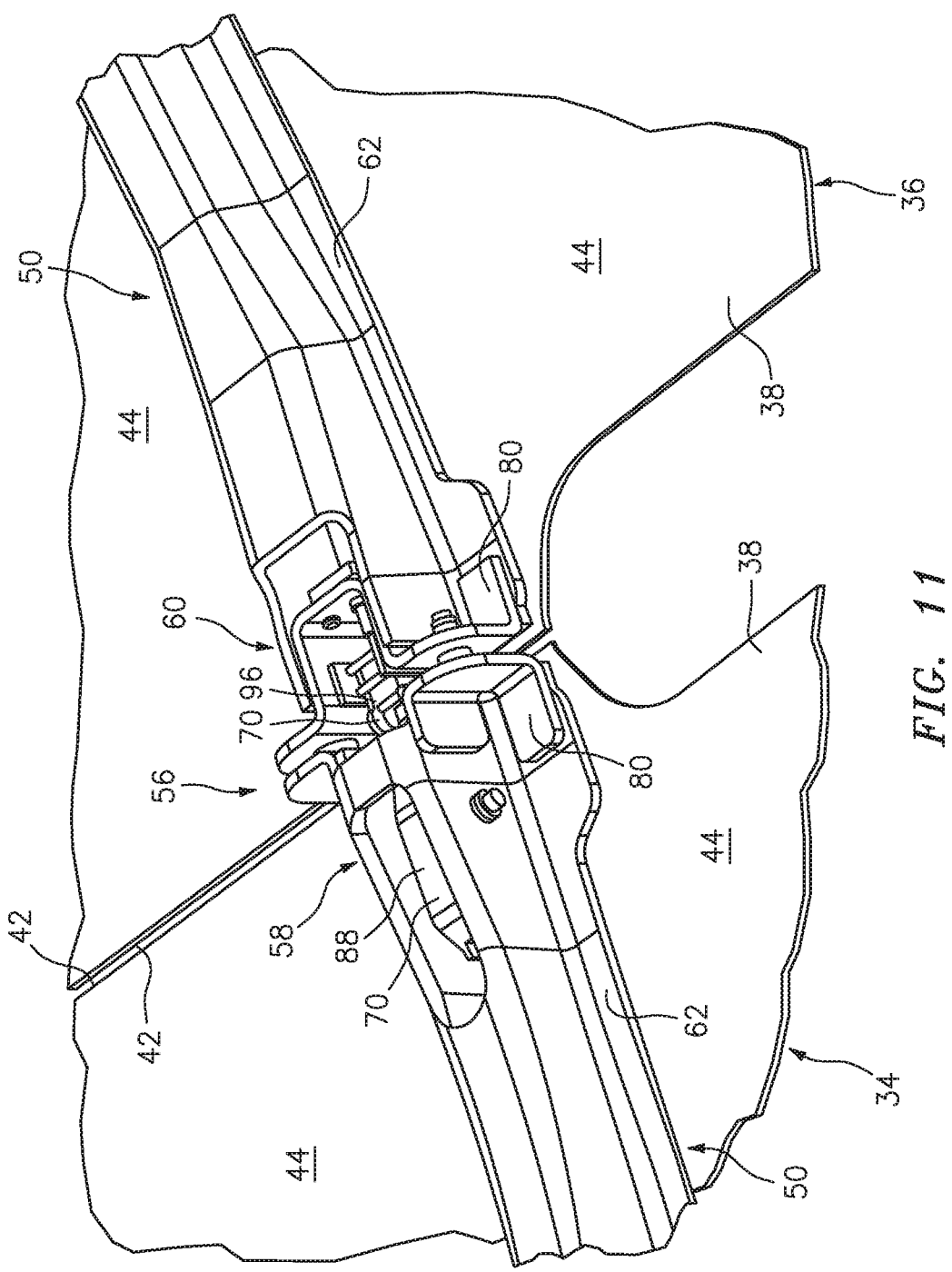
FIG. 11 illustrates a perspective view of the stiffener of FIG. 5 and the stiffener of FIG. 8 engaged with one another according to one or more embodiments of the present disclosure.

In various embodiments, the at least one stiffener 50 may include at least one interface member 80 mounted to the stiffener body 62 at the second stiffener end 74. As shown in FIG. 11, for example, the at least one interface member 80 of the at least one stiffener 50 of the first cowl door 34 may be configured to interface with the opposing at least one interface member 80 of the at least one stiffener 50 of the second cowl door 36. In various embodiments, the interface member 80 may be made from a same material as the stiffener body 62 such as, for example, a thermoplastic material. In various other embodiments, the at least one interface member 80 may be made from any suitable material such as, for example, titanium or aluminum. The at least one interface member 80 may be mounted to the stiffener body 62 by one or more welds 82 similar to the plurality of welds 78. The interface member 80 may additionally or alternatively be mounted to the stiffener body 62 by fasteners, adhesives, and/or any other suitable means for mounting.

In various embodiments, the at least one interface member 80 may include at least one aperture 84 and/or at least one post 86. The at least one aperture 84 of the at least one interface member 80 is configured to interface with an opposing at least one post 86 to ensure proper engagement of the at least one latch assembly 56. The interface between the at least one aperture 84 and the corresponding at least one post 86 may further improve the structural integrity of the nacelle 24 by limiting radial and/or axial movement of the cowl doors 34, 36 relative to one another. The at least one aperture 84 may extend through the at least one interface member 80 in a circumferential direction. Similarly, the at least one post 86 may project from the at least one interface member 80 in a circumferential direction. In various embodiments, the at least one post 86 may be formed integrally with the at least one interface member 80, while in various other embodiments, the at least one post 86 may be fixedly mounted within the at least one aperture 84 of the at least one interface member 80.

Figure 5:
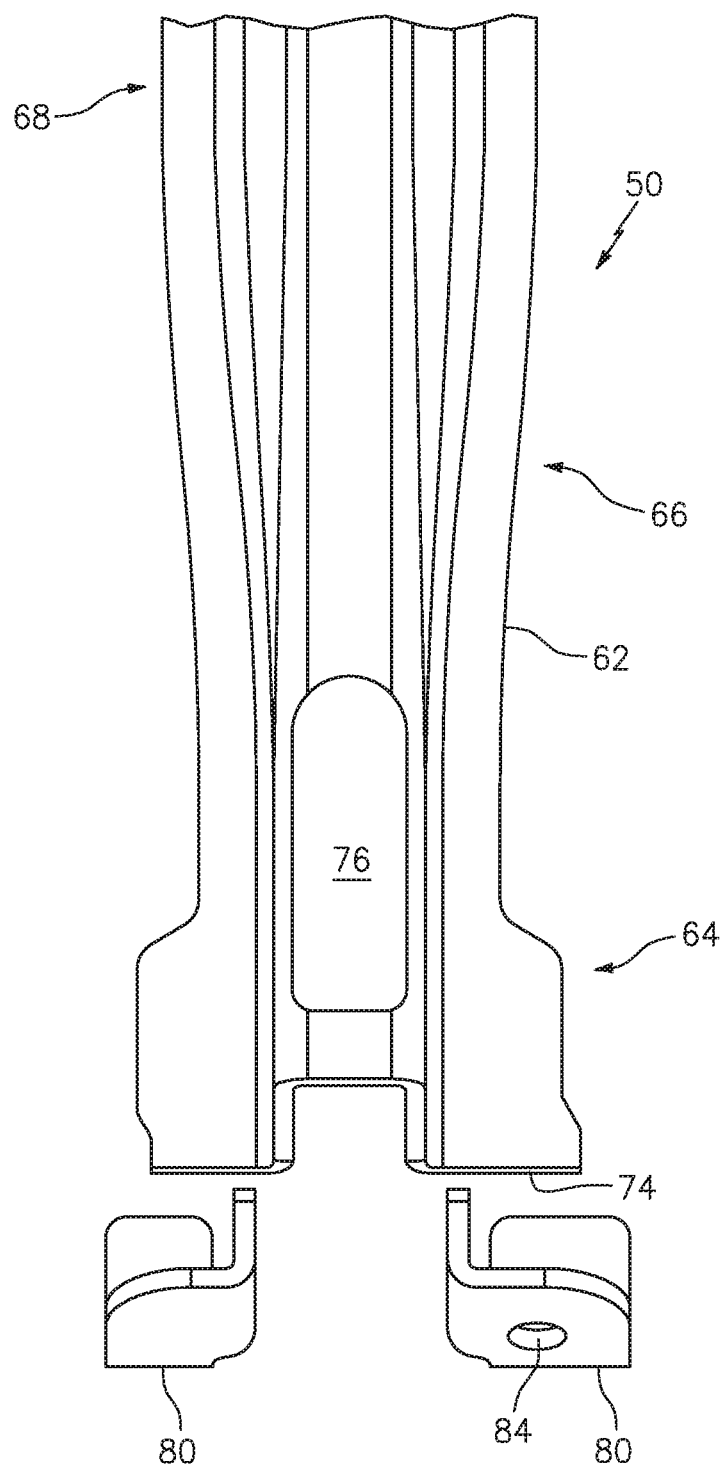
FIG. 5 illustrates a top exploded view of a stiffener for the cowl door of FIG. 3 according to one or more embodiments of the present disclosure.
Figure 6:
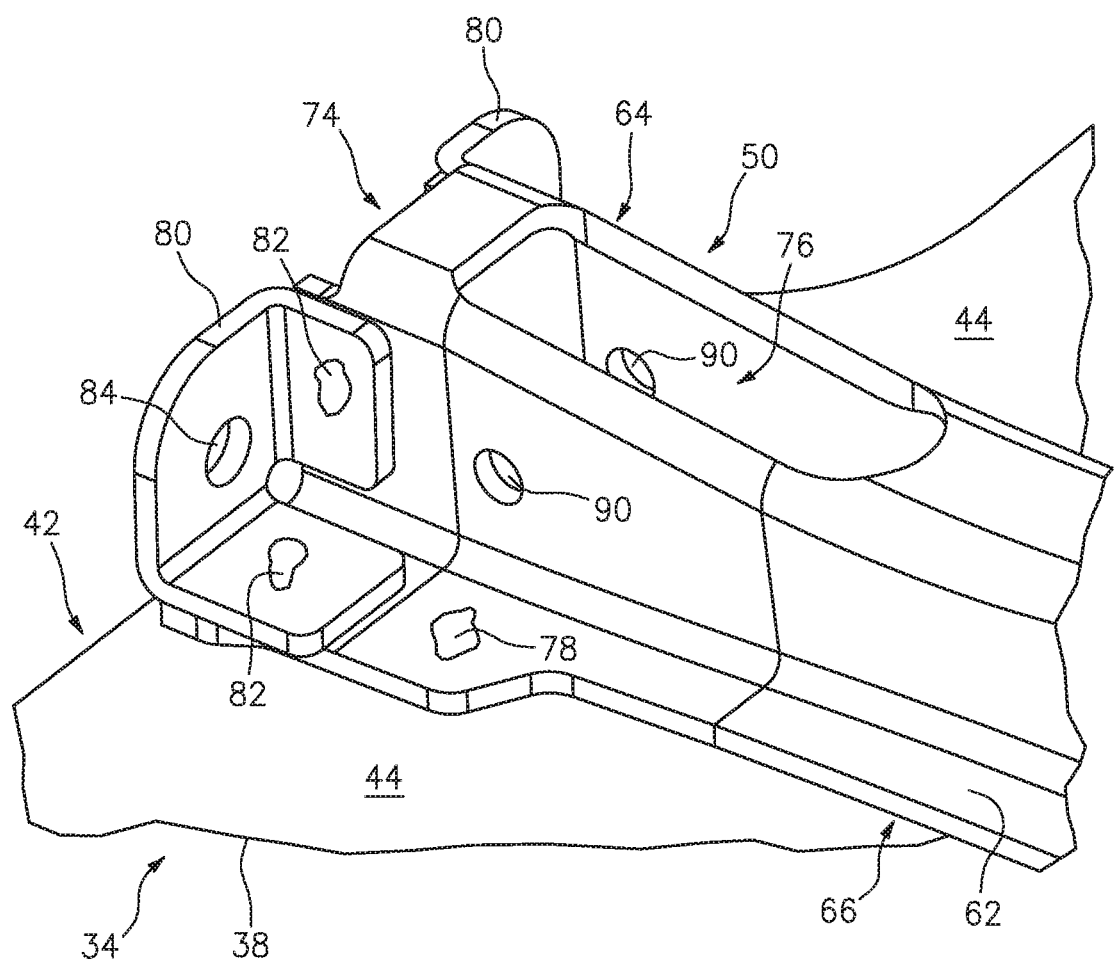
FIG. 6 illustrates a perspective view of the stiffener of FIG. 5 according to one or more embodiments of the present disclosure.
Figure 7:
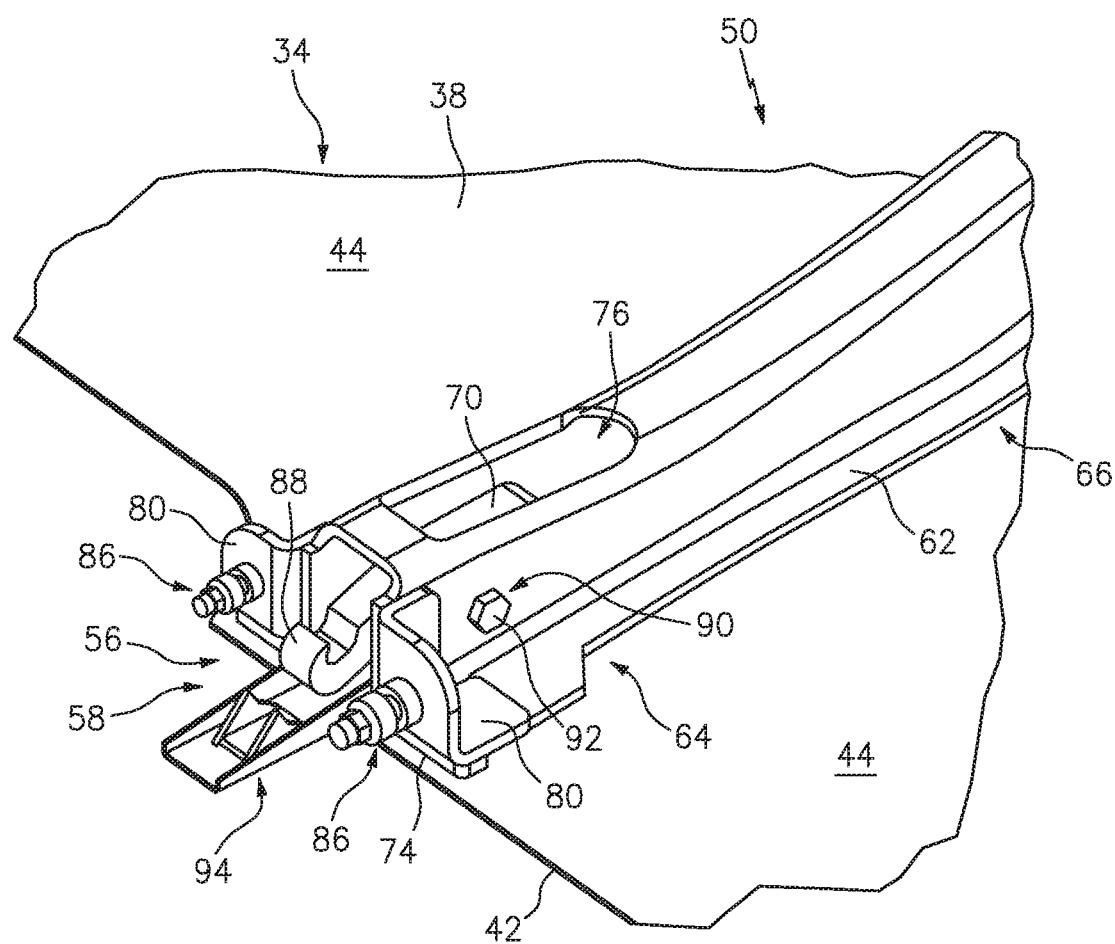
FIG. 7 illustrates another perspective view of the stiffener of FIG. 5 according to one or more embodiments of the present disclosure.

Referring to FIGS. 5-7, in various embodiments, the latch member 70 of the first portion 58 of the at least one latch assembly 56 is a latch 88 rotatably mounted to the stiffener body 62. The latch housing section 64 of the stiffener body 62 may include a pair of apertures 90 through which the latch 88 is rotatably mounted by, for example, a pin 92 extending through the pair of apertures 90. The latch 88 may be in operable communication with a latch handle 94 such that operation of the latch handle 94 effects a corresponding operation of the latch 88. The latch handle 94 may be formed through the cowl door body 38 and may form a portion of the exterior surface 46 of the cowl door body 38 when the latch handle 94 is in a latched position. Accordingly, the latch 88 may be operated with the latch handle 94 from a position exterior to the nacelle 24 to engage or disengage the at least one latch assembly 56 of the cowl doors 34, 36 (e.g., by interacting with the respective second portion 60 of the at least one latch assembly 56).

Figure 8:
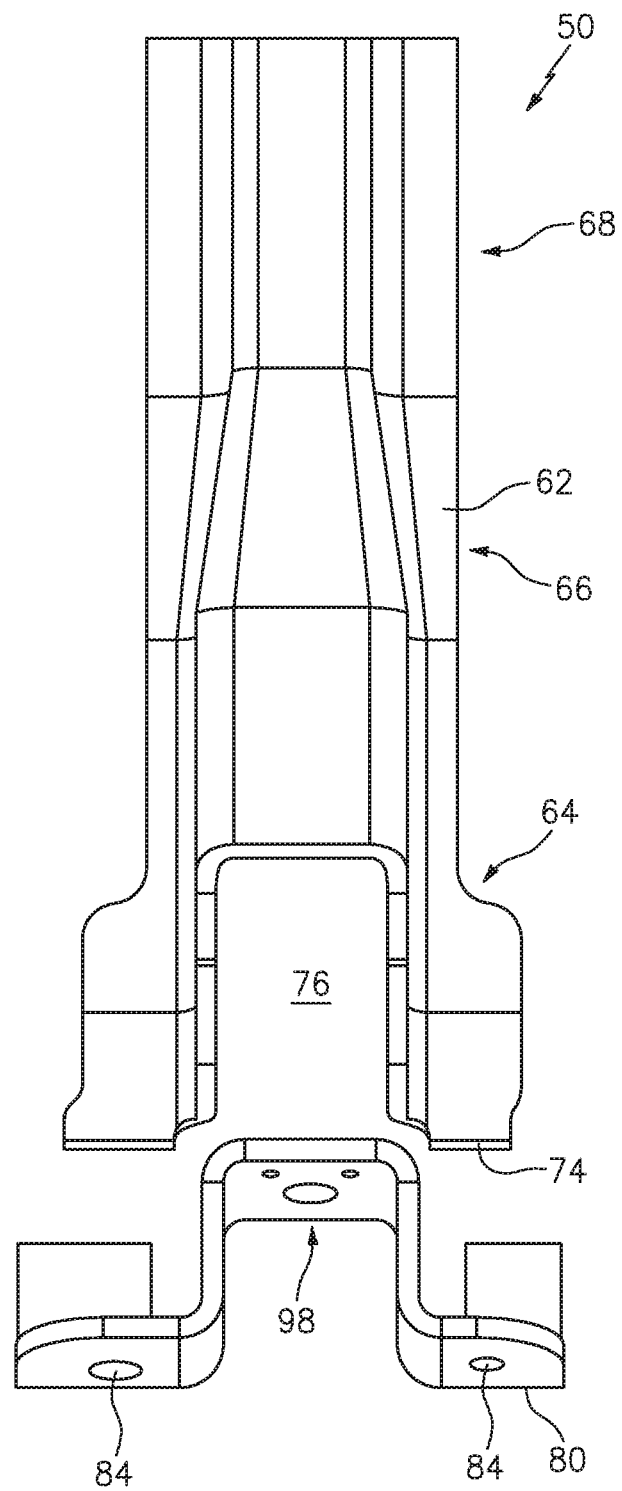
FIG. 8 illustrates a top exploded view of another stiffener for the cowl door of FIG. 3 according to one or more embodiments of the present disclosure.
Figure 9:
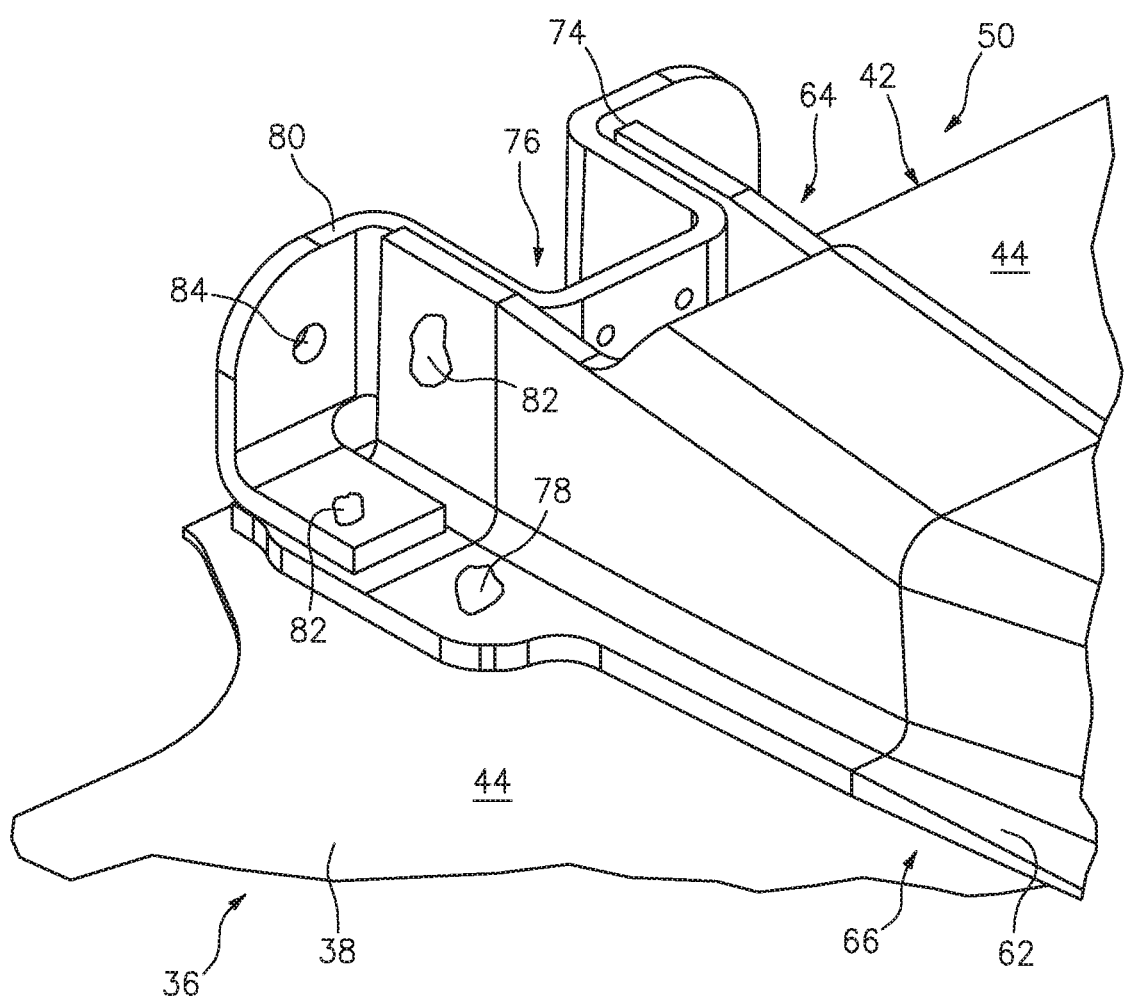
FIG. 9 illustrates a perspective view of the stiffener of FIG. 8 according to one or more embodiments of the present disclosure.
Figure 10:
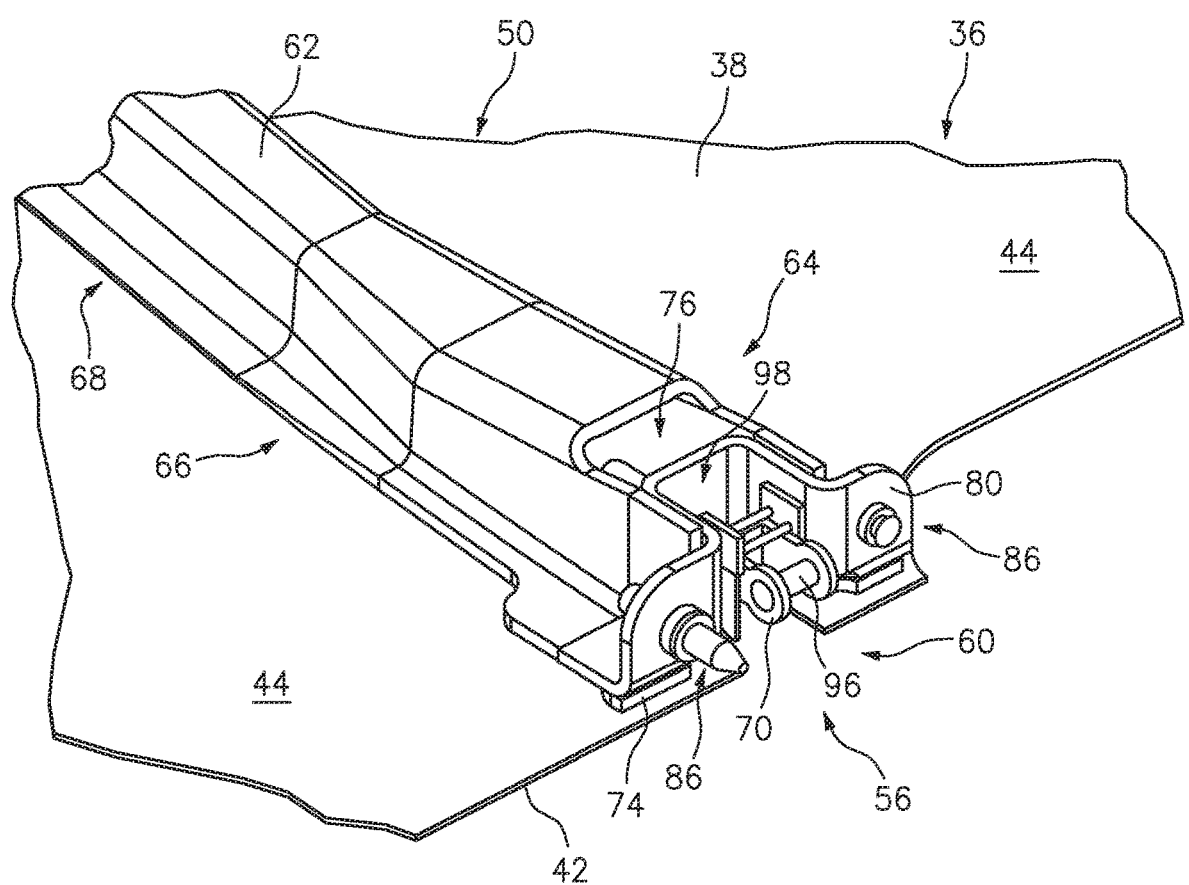
FIG. 10 illustrates another perspective view of the stiffener of FIG. 8 according to one or more embodiments of the present disclosure.

Referring to FIGS. 8-10, in various embodiments, the latch member 70 of the second portion 60 of the at least one latch assembly 56 is a keeper 96 fixedly mounted to the stiffener body 62. The at least one interface member 80 may include at least one aperture 98 within which the keeper 96 may be fixedly mounted to the stiffener body 62 via the interface member 80. The keeper 96 is configured to be captured by the latch 88 as the latch handle 94 is operated from an unlatched to a latched position, thereby engaging the at least one latch assembly 56 and securing the cowl doors 34, 36 in the closed position.

Referring to FIG. 11, the at least one latch assembly 56 is illustrated in the engaged condition. The latch 88 and the keeper 96 are mated with one another, thereby securing the cowl doors 34, 36 in the closed position.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A cowl door comprising:
a cowl door body having a first side, a second side, and an interior surface and an exterior surface extending between the first side and the second side, the cowl door body configured to be rotatably mounted to a structure at the first side of the cowl door body;
at least one stiffener mounted to the interior surface of the cowl door body and extending lengthwise at least a portion of a distance between the first side and the second side of the cowl door body, the at least one stiffener comprising a stiffener body comprising a latch housing section disposed at a second stiffener end of the stiffener body proximate the second side of the cowl door body; and
a latch member mounted to the stiffener body and disposed at least partially within the latch housing section of the stiffener body;
wherein the stiffener body further comprises a mount portion mounted to the interior surface of the cowl door body and a hoop portion projecting outward from the mount portion; and
wherein the stiffener body has a first stiffener end opposite the second stiffener end, wherein the stiffener body further comprises a support section that extends from the first stiffener end a portion of a length of the stiffener body and the latch housing section extends from the second stiffener end another portion of the length of the stiffener body, and wherein the hoop portion of the stiffener body has a first width at the latch housing section and a second width at the support section, and the first width is greater than the second width.

2. The cowl door of claim 1, wherein the latch member is a latch rotatably mounted to the stiffener body.

3. The cowl door of claim 1, wherein the latch member is a keeper fixedly mounted to the stiffener body.

4. The cowl door of claim 1, wherein the stiffener body has a first height at the latch housing section and a second height at the support section, different than the first height.

5. The cowl door of claim 4, wherein the stiffener body further comprises a transition section disposed between the latch housing section and the support section and wherein the transition section has a transition height and a transition width that transitions from the first height and the first width to the second height and the second width along a length of the transition section from the latch housing section to the support section.

6. The cowl door of claim 1, wherein the stiffener body is made from a composite material.

7. A nacelle for a gas turbine engine comprising:
a nacelle body; and
a first cowl door, the first cowl door comprising:
    a first cowl door body having a first side, a second side, and an interior surface and an exterior surface extending between the first side and the second side, the first cowl door body rotatably mounted to the nacelle body at the first side of the second cowl door;
    at least one first stiffener mounted to the interior surface of the first cowl door body and extending lengthwise at least a portion of a distance between the first side and the second side of the first cowl door body, the at least one first stiffener comprising a first stiffener body comprising a first latch housing section disposed at a second stiffener end of the first stiffener body proximate the second side of the first cowl door body; and
    a first latch member mounted to the first stiffener body and disposed at least partially within the first latch housing section of the first stiffener body;
    wherein the first stiffener body further comprises a mount portion mounted to the interior surface of the first cowl door body and a hoop portion projecting outward from the mount portion; and
    wherein the first stiffener body has a first stiffener end opposite the second stiffener end, wherein the first stiffener body further comprises a support section that extends from the first stiffener end a portion of a length of the first stiffener body and the latch housing section extends from the second stiffener end another portion of the length of the first stiffener body, and wherein the hoop portion of the stiffener body has a first width at the latch housing section and a second width at the support section, and the first width is greater than the second width.

8. The nacelle of claim 7 further comprising:
a second cowl door configured to be latched to the first cowl door, the second cowl door comprising:
    a second cowl door body having a first side, a second side, and an interior surface and an exterior surface extending between the first side and the second side, the second cowl door body rotatably mounted to the nacelle body at the first side of the second cowl door;
    at least one second stiffener mounted to the interior surface of the second cowl door body and extending lengthwise at least a portion of a distance between the first side and the second side of the second cowl door body, the at least one second stiffener comprising a second stiffener body comprising a second latch housing section disposed at a second stiffener end of the second stiffener body proximate the second side of the second cowl door body; and
    a second latch member mounted to the second stiffener body and disposed at least partially within the second latch housing section of the second stiffener body.

9. The nacelle of claim 8, wherein the first latch member and the second latch member are configured to engage one another with the first cowl door and the second cowl door in respective closed positions.

10. The nacelle of claim 9, wherein the first latch member is a latch rotatably mounted to the first stiffener body and the second latch member is a keeper fixedly mounted to the second stiffener body.

11. The nacelle of claim 10, wherein the at least one first stiffener further comprises a first interface member mounted to the first stiffener body and the at least one second stiffener further comprises a second interface member mounted to the second stiffener body.

12. The nacelle of claim 11, wherein the first interface member and the second interface member are configured to engage one another with the first cowl door and the second cowl door in the respective closed positions.

13. The nacelle of claim 10, wherein the first stiffener body and the second stiffener body are made from a composite material.

14. A method for forming a cowl door, the method comprising:
providing a cowl door body having a first side, a second side, and an interior surface and an exterior surface extending between the first side and the second side, the cowl door body configured to be rotatably mounted to a structure at the first side;
mounting at least one stiffener to the interior surface of the cowl door body, the at least one stiffener extending lengthwise at least a portion of a distance between the first side and the second side of the cowl door body, the at least one stiffener comprising a stiffener body comprising a latch housing section disposed at a second stiffener end of the stiffener body proximate the second side of the cowl door body; and
mounting a latch member to the stiffener body, the latch member disposed at least partially within the latch housing section of the stiffener body;
wherein the stiffener body further comprises a mount portion and a hoop portion projecting outward from the mount portion and the step of mounting the at least one stiffener includes mounting the mount portion to the interior surface of the cowl door body; and
wherein the stiffener body has a first stiffener end opposite the second stiffener end, wherein the stiffener body further comprises a support section that extends from the first stiffener end a portion of a length of the stiffener body and the latch housing section extends from the second stiffener end another portion of the length of the stiffener body, and wherein the hoop portion of the stiffener body has a first width at the latch housing section and a second width at the support section, and the first width is greater than the second width.

15. The method of claim 14, wherein the stiffener body and the cowl door are made from a composite material.

16. The method of claim 15, wherein the step of mounting the at least one stiffener to the interior surface of the cowl door body includes forming a thermoplastic weld between the at least one stiffener and the cowl door body.

17. The method of claim 14, wherein the latch member is a latch rotatably mounted to the stiffener body.

18. The method of claim 14, wherein the latch member is a keeper fixedly mounted to the stiffener body.

* * * * *